W. I. MARSH.
Whiffletree-Guard.

No. 223,745. Patented Jan. 20, 1880.

WITNESSES:
C. Neveux
C. Sedgwick

INVENTOR:
W. I. Marsh
BY Munn & Co.
ATTORNEYS.

UNITED STATES PATENT OFFICE.

WASHINGTON IRVING MARSH, OF NORTHVILLE, MICHIGAN.

WHIFFLETREE-GUARD.

SPECIFICATION forming part of Letters Patent No. 223,745, dated January 20, 1880.

Application filed July 30, 1879.

*To all whom it may concern:*

Be it known that I, WASHINGTON I. MARSH, of Northville, in the county of Wayne and State of Michigan, have invented a new and Improved Whiffletree-Guard, of which the following is a specification.

Figure 1:
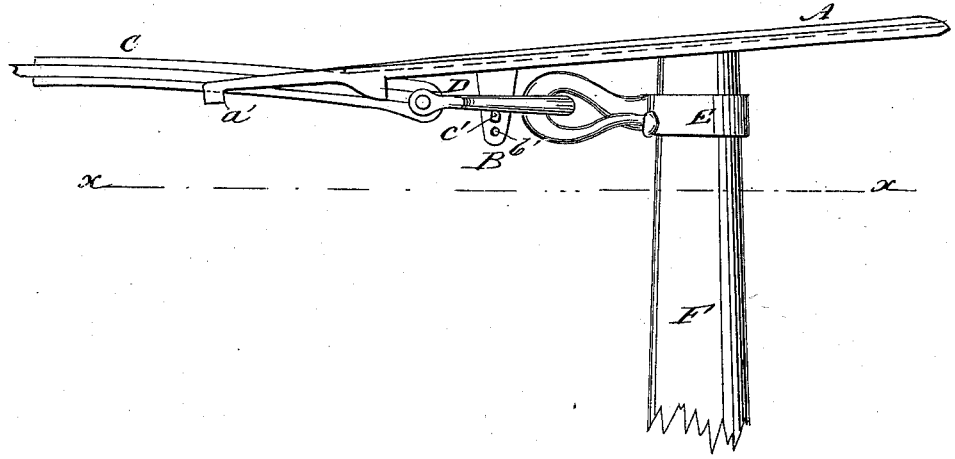
Figure 2:
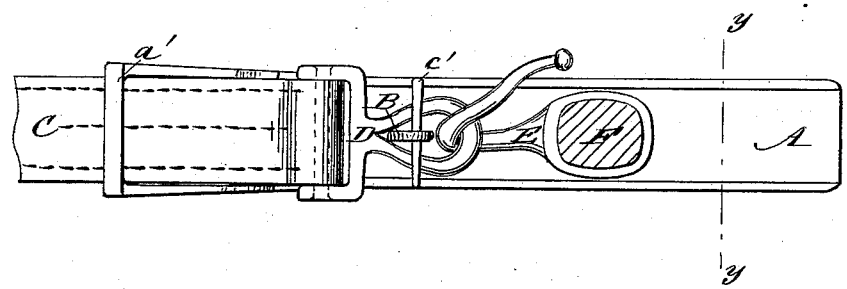
Figure 3:
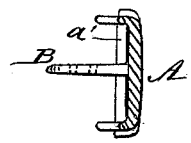

Figure 1 is a plan, showing the guard in place. Fig. 2 is a side elevation on line $x\,x$, Fig. 1, showing the manner of attachment to the trace. Fig. 3 is a sectional elevation on line $y\,y$, Fig. 2.

Similar letters of reference indicate corresponding parts.

The object of this invention is to provide a device for preventing the ends of the whiffletree from catching upon or striking against any objects.

The invention consists of a plate of wood or metal or other suitable material, attached to the trace of a harness just in front of the cockeye, and extending rearward past the hook and end of the whiffletree.

In the drawings, A represents the plate or guard, one end of which is formed into a loop, as shown at $a'$. B is the tongue of the guard, projecting at a right angle from it, and provided with holes $b'$, through which a pin, $c'$, may be inserted.

C is the trace, to which is attached the cockeye D, into which hooks the hook E of the whiffletree F.

The guard is attached by passing the trace through the loop $a'$, and by inserting the tongue B through the cockeye and holding it there by the insertion of the pin $c'$ through one of the holes $b'$, as shown. This is a simple and effective way of attaching the device; but I do not propose to confine myself to this method, because other methods may be found to be sufficiently effective.

It is well known that trees, fences, posts, &c., on public roads are often defaced and injured by the end of a whiffletree striking against them, and in agricultural pursuits the fruit-trees, fences, standing corn and cotton, hedges, &c., are especially exposed to such injury, and that harm and accident to the harness or vehicle not unfrequently occur from the catching of the whiffletree end in some object. All these dangers are avoided by this guard, which holds the whiffletree in place and restricts its lateral swing, while it prevents the entanglement of any object with it.

I am aware that a guard has been used which consists in passing the end of the trace around the end of the whiffletree; but this requires a lengthening of the traces and a whiffletree especially provided for the attachment, and the bending of the trace around the end of the whiffletree gives it an unsightly appearance, makes it awkward to handle, and causes it to break and wear very rapidly.

The guard herein shown and described may be readily applied to any trace and used with any whiffletree, and will not throw either of them out of shape or position nor lessen their endurance.

Having thus fully described my invention, I claim as new and desire to secure by Letters Patent—

1. The within-described whiffletree-guard A, provided with loop $a'$ and tongue B, substantially as and for the purpose described.

2. The combination of guard A, trace C, cockeye D, hook E, and whiffletree F, substantially as herein shown, and for the purpose described.

WASHINGTON IRVING MARSH.

Witnesses:
S. D. FREDERICK,
JAS. M. HOBART.